US008879888B2

(12) United States Patent
Girgensohn et al.

(10) Patent No.: US 8,879,888 B2
(45) Date of Patent: Nov. 4, 2014

(54) VIDEO CLIP SELECTION VIA INTERACTION WITH A HIERARCHIC VIDEO SEGMENTATION

(71) Applicant: Fuji Xerox Co., Ltd, Tokyo (JP)

(72) Inventors: Andreas Girgensohn, Palo Alto, CA (US); Lynn Donelle Wilcox, Redwood City, CA (US); Frank M. Shipman, III, College Station, TX (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/796,904

(22) Filed: Mar. 12, 2013

(65) Prior Publication Data

US 2014/0270708 A1 Sep. 18, 2014

(51) Int. Cl.
*H04N 9/80* (2006.01)
*H04N 9/79* (2006.01)
*H04N 19/179* (2014.01)
*G06F 17/30* (2006.01)

(52) U.S. Cl.
CPC ............. *H04N 9/79* (2013.01); *H04N 19/0029* (2013.01); *G06F 17/30843* (2013.01)
USPC ........................................................ 386/241

(58) Field of Classification Search
CPC .................... G06F 17/30852; G06F 17/30858; G06F 17/30843; H04N 19/00163
USPC ................................................. 386/241, 282
See application file for complete search history.

(56) References Cited

U.S. PATENT DOCUMENTS 5,999,173 A 12/1999 Ubillos
6,597,375 B1 7/2003 Yawitz
8,117,204 B2 2/2012 Girgensohn et al.
8,631,326 B2 * 1/2014 Meaney et al. ................ 715/723
2004/0125124 A1 * 7/2004 Kim et al. ..................... 345/716

OTHER PUBLICATIONS

A. Girgensohn, et al., "Adaptive Clustering and Interactive Visualizations to Support the Selection of Video Clips," Proceedings of ACM International Conference on Multimedia Retrieval 2011, 2011, Article No. 34.
W. Hürst, et al., "Advanced User Interfaces for Dynamic Video Browsing," Proceedings of ACM Multimedia 2004, 2004, pp. 742-743.
D. Kimber et al., "Acoustic Segmentation for Audio Browsers," Proceedings Interface Conference, Sydney, Australia, Jul. 1996.
L.D. Wilcox et al., "Segmentation of Speech using Speaker Identification," Proc. International Conference on Acoustics, Speech and Signal Processing, Adelaide, Australia, vol. 1, pp. 161-164, Apr. 1994, copyright IEEE 1992.

* cited by examiner

*Primary Examiner* — Huy T Nguyen
(74) *Attorney, Agent, or Firm* — Sughrue Mion, PLLC

(57) ABSTRACT

A video segment selection method and system that determines a set of segment boundaries in the video, determines a segment boundary tree from the set of segment boundaries, presents a video timeline that shows a plurality of segment boundaries from a first level of the segment boundary tree, receives a first selection point and a first request to change a zoom factor for an interval of the video timeline around the first selection point, and, in response to the first request to change the zoom factor for the interval of the video timeline around the first selection point, updates the video timeline in the interval around the first selection point to show a plurality of segment boundaries from a second level of the segment boundary tree corresponding to the changed zoom factor.

25 Claims, 16 Drawing Sheets

VIDEO CLIP SELECTION VIA INTERACTION WITH A HIERARCHIC VIDEO SEGMENTATION

BACKGROUND

1. Field

The present disclosure relates generally to media reuse and sharing, such as for video clip selection.

2. Description of the Related Art

Video reuse and sharing often requires selecting a shorter segment of video within an existing longer video. Selecting such a video clip involves locating the desired material within the existing longer video and selecting precise start and end points for the shorter segment of video. Automatic selection of start and end points may be used but often results in jarring effects, such as starting or ending a video clip in the middle of visible action or in the middle of a sentence. Due to the shortcomings of automatic selection, video editing software typically assumes that users will manually select start and end points for a video clip.

Related art interfaces for selecting video clips include browsing or scrubbing interfaces, such as timelines with sliders. These interfaces provide control to users but do not provide assistance in locating good start and end points. What is needed is an interface that reduces the effort required to select good start and end points for a video clip while maintaining user control over the start and end points.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
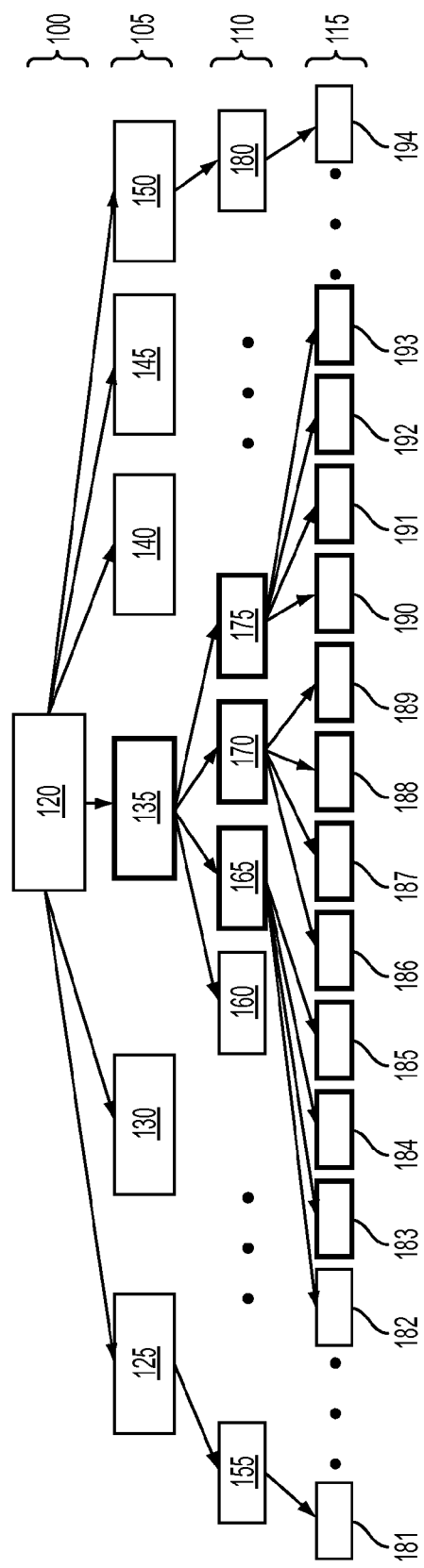
FIG. 1 illustrates the top three levels of a segment boundary tree.

According to an embodiment, an assistive technique is provided that may reduce the effort required to select good video clip start and end points through automatic hierarchical segmentation of a video and an interface for quickly navigating this hierarchy while ultimately maintaining user control over the start and end points. A video segmentation algorithm uses a combination of audio and video features to determine the resulting hierarchic segmentation, and an interface is provided for selecting a video clip through interaction with the hierarchic segmentation.

Video Segmentation Algorithm

According to an embodiment, hierarchical segment boundaries are used to aid a user in finding the start and end points for a desired clip. An initial set of boundaries is determined using a combination of audio and video differences between segments. Then agglomerative clustering is performed to create a boundary hierarchy, with coarse boundaries corresponding to longer segments at the top level and finer boundaries corresponding to shorter segments at the lower levels.

The determination of the initial set of boundaries may include the video segment selecting system performing computations using the algorithms discussed below or other algorithms. Alternatively, the determination of the initial set of boundaries may include the video segment selecting system receiving information about the initial set of boundaries from an external system or external data source.

Likewise, the determination of the boundary hierarchy may include the video segment selecting system performing computations using the algorithms discussed below or other algorithms. Alternatively, the determination of the boundary hierarchy may include the video segment selecting system receiving information about the boundary hierarchy from an external system or external data source.

An initial set of boundaries may be obtained by sampling boundary candidates every 200 milliseconds. Alternatively, another interval may be used. The boundary strengths may be used as distances of agglomerative clustering. Adjacent segments with the weakest boundaries may be iteratively merged until there is single cluster. The boundary strength between adjacent segments may be determined based on a combination of image differences, audio energy differences, and sound differences.

Each segment may be represented by a keyframe that is selected as the highest quality frame in the segment, where quality is measured by sharpness and brightness. Alternatively, each segment may be represented by a keyframe that is the first frame in the segment, a middle frame in the segment, or the last frame in the segment. Other criteria may be also be used to select a keyframe to represent each segment.

Image differences may be computed from a self-similarity matrix composed of the color correlogram differences from the first frames at the 200 ms segments. A 10-second Gaussian checkerboard kernel may be used across the self-similarity matrix to compute an image difference that ranges from zero to one based on the correlation between the self-similarity matrix and the checkerboard kernel.

Audio energy differences may be determined based on silences in the audio. Silences are determined using the root mean square (rms) value of the audio difference signal. The rms of the audio samples in each 50 ms interval may be computed. To remove DC components and to provide a simple high-pass filter, the previous value may be subtracted from every audio sample. The resulting value may be compared to two silence thresholds. The silence score may be set to one for everything below the lower threshold and to zero for everything above the upper threshold. A floating-point score may be assigned for values between the thresholds. To handle audio of different noise levels, the two thresholds may be determined as percentiles of the values in all audio intervals, typically at the 5- and 10-percentiles. If less than a threshold, the score may be set to one; otherwise, it may be set to zero. The audio energy difference at the initial segment boundaries may be equal to the average silence score over a 250 ms interval centered at the boundary.

Sound differences may be determined using the speaker segmentation technique described in "Segmentation of Speech using Speaker Identification," L. D. Wilcox, F. R. Chen, D. Kimber, and V. Balasubramanian, *Proc. International Conference on Acoustics, Speech and Signal Processing*, Adelaide, Australia, vol. 1, pp. 161-164, April 1994. The method was shown to perform well in finding differences in speakers as well as music in the audio in "Acoustic Segmentation for Audio Browsers," Don Kimber, Lynn Wilcox, Proceedings Interface Conference, Sydney, Australia, July 1996. The algorithm may use unsupervised clustering followed by a HMM to determine the different speakers/sounds in the audio and to optimize the boundaries between the sounds. This algorithm gives segment boundaries at a fine time scale, typically 20 ms, which may be given a difference score of one. All other points on the fine time scale may be given a difference score of zero. The sound difference at the initial segment boundary may be the Hamming weighted average of the fine grained difference scores in a 250 ms interval centered at the boundary.

The final boundary strength may be a weighted average of the image, audio energy, and sound differences.

The segment boundary tree (binary cluster tree) may be converted to a tree with higher fanout by combining adjacent tree nodes. Typically, the fanout at the root level is between five and eight. At the other levels, the fanout is between three and five. The selection of the fanout depends on the available display space. The tree may be balanced to avoid long navigation paths to the tree leaves, using a method such at that described in U.S. Pat. No. 8,117,204.

FIG. 1 illustrates the top three levels of a segment boundary tree created using the video segmentation algorithm described above, according to an embodiment. The segment boundary tree includes keyframe 120 that represents the entire video 100. The top level 105 of the segment boundary tree includes keyframes 125, 130, 135, 140, 145, and 150 which represent coarse boundaries corresponding to comparatively longer segments of the video. The second level 110 of the segment boundary tree includes keyframes 155, 160, 165, 170, 175, and 180 which represent finer boundaries corresponding to comparatively shorter segments of the video. The third level 115 of the segment boundary tree includes keyframes 181, 182, 183, 184, 185, 186, 187, 188, 189, 190, 191, 192, 193, and 194 which represent even finer boundaries corresponding to even shorter segments of the video.

At the second level 110 of the segment boundary tree, keyframe 155 represents a comparatively finer segment boundary that is located nearest to the comparatively coarser segment boundary represented by keyframe 125 at the first level 105 of the segment boundary tree. Likewise, at the second level 110 of the segment boundary tree, keyframes 160, 165, 170, and 175 represent comparatively finer segment boundaries that are located nearest to the comparatively coarser segment boundary represented by keyframe 135 at the first level 105 of the segment boundary tree.

The segment boundary tree may include additional levels and additional nodes beyond those that are illustrated in FIG. 1.

Figure 2:
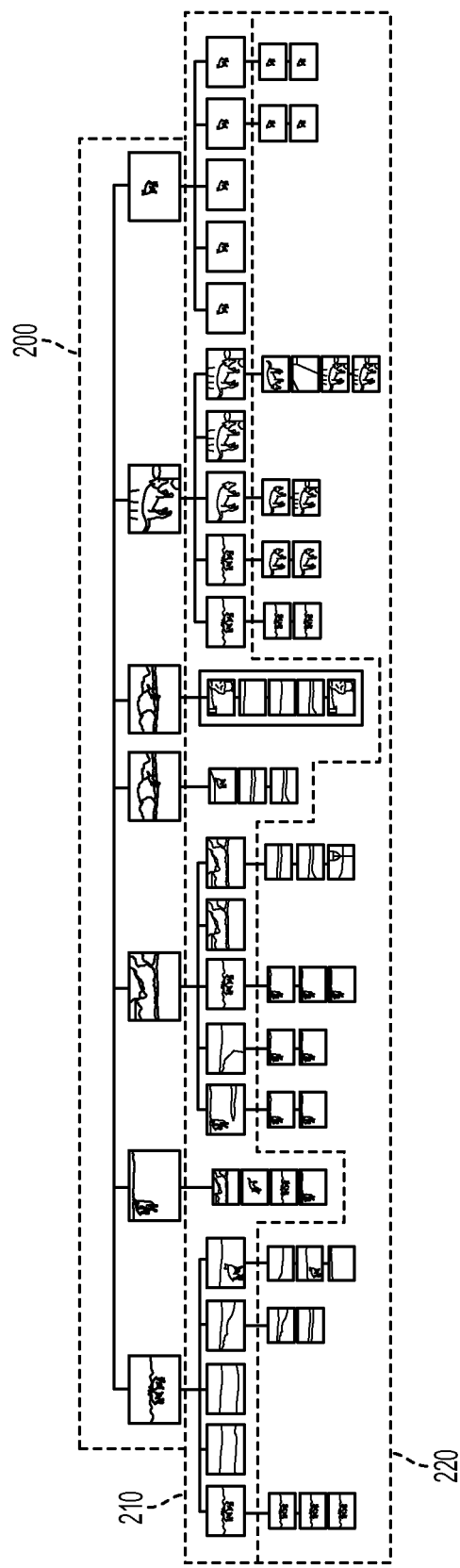
FIG. 2 illustrates an example of a segment boundary tree created from a video, according to an embodiment.

FIG. 2 illustrates an example of a segment boundary tree created from a video, according to an embodiment. The segment boundary tree depicted in FIG. 2 includes a first (top) level 200, a second level 210, and a third level 220. The first (top) level 200 includes keyframes that represent coarse boundaries corresponding to comparatively longer segments of the video. The second level 210 of the segment boundary tree includes keyframes that represent finer boundaries corresponding to comparatively shorter segments of the video. The third level 220 of the segment boundary tree includes keyframes that represent even finer boundaries corresponding to even shorter segments of the video.

Video Segment Selection Approach

Figure 3:
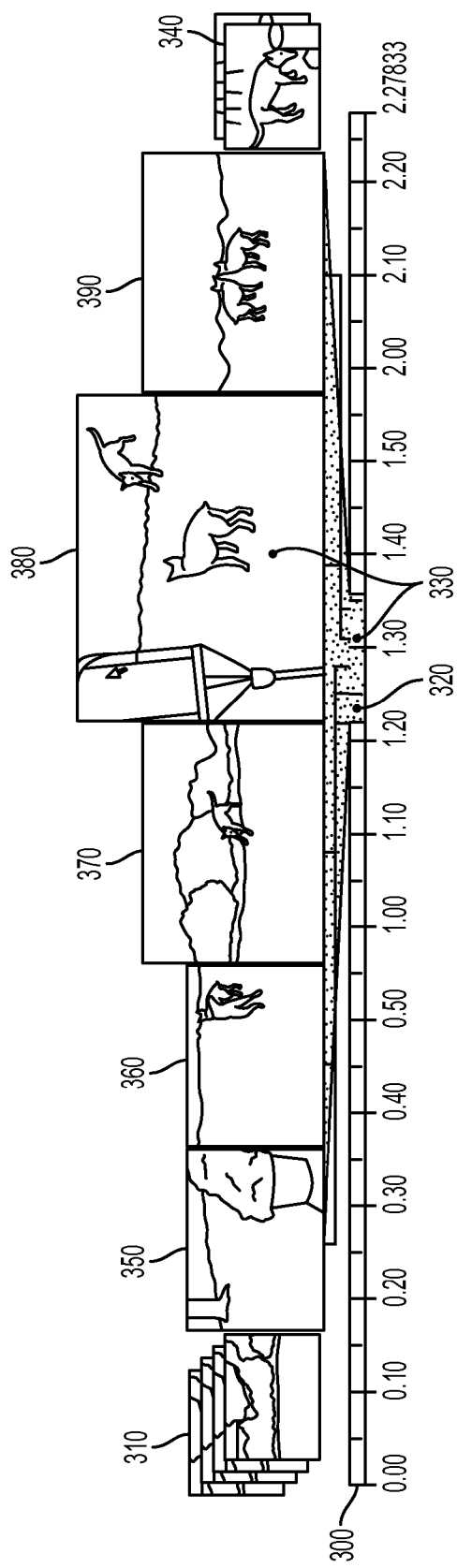
FIG. 3 illustrates a video clip selection interface, according to an embodiment.

FIG. 3 illustrates a video clip selection interface, according to an embodiment. The video clip selection interface provides an interface for selecting a video clip from a video. According to an embodiment, the system may output the selected video clip as a new video file. According to another embodiment, the system may crop the existing file, deleting portions of the video that are not included in the selected video clip. According to another embodiment, the system may output time information or other information that identifies the start point and/or the end point of the selected video clip.

The video clip selection interface may include a timeline 300 representing time points in a video. The timeline 300 shown in FIG. 3 includes markings at ten second intervals throughout the 2 minute and 27.833 second video.

Keyframes or thumbnails may be shown above the timeline 300. Each of the keyframes 350, 360, 370, 380, and 390 represents a segment boundary within the region 320 of the timeline 300. Each of the keyframes 350, 360, 370, 380, and 390 is connected to the timeline 300 by a line denoting a time point in the video corresponding to that segment boundary. For example, a line shows the connection 330 between the segment boundary represented by keyframe 380 and the corresponding time point on the timeline (approximately 1:23).

Keyframe stacks 310 and 340 that include keyframes representing segment boundaries at time points falling outside of the region 320 of the timeline 300 may be displayed. Keyframe stack 310 may include keyframes corresponding to time points in the video that temporally precede the time point corresponding to keyframe 350. Keyframe stack 340 may include keyframes corresponding to time points in the video that temporally follow the time point corresponding to keyframe 390.

According to an embodiment, a video clip selection interface does not present the entire segment boundary tree to a user. Instead, a sequence of keyframes representing tree nodes is displayed. Initially, the keyframes representing the nodes of the first tree level are shown.

In an embodiment, a user first navigates the segment hierarchy, which is represented by the segment boundary tree, to select an element in the segment hierarchy as an initial definition of both the start and end points for the new segment being defined. The user may then select and move the start and end points one at a time. According to another embodiment, the user selects either the start point or the end point and navigates the segment hierarchy to set that point. Next, the process is repeated to set the other point.

In an embodiment, a user may select from multiple workflows for setting a start point and/or end point. The interface may support various events including selection of a start or end point, navigating up or down in the segment hierarchy, moving a selected start or end point, and selecting a predefined segment from the segment hierarchy.

The interface may allow user interaction through a keyboard, a mouse, touch gestures, and other forms of input. Some user interactions with the interface may result in multiple events. For example, clicking on a keyframe for a particular level in the segment hierarchy may be interpreted as a segment selection event and a navigate up/down event. As another example, performing a touch gesture at one end of the current segment may be interpreted as a selection of that end of the segment and also cause some change to that end of the segment.

The interface may present video as a sequence of keyframes representing segments in the segment boundary tree and a timeline to show the extent of such segments. The timeline may be non-linear in order to provide a user with additional feedback. For example, consider the case of a one hour (3,600 second) video and a 900 pixel wide timeline. Each pixel on that timeline would correspond to a 4 second interval in the video. Thus, changing a start or end point at the finest granularity of 200 milliseconds would not result in a visible change in the timeline.

According to an embodiment, a non-linear timeline is presented that is zoomed in at the start and end points selected for the video clip, so that changes are visible while the entire duration of the video is represented. The portions of the timeline surrounding the start and end points are zoom focus points. According to another embodiment, an additional zoom focus point may surround the current video playback position.

Each zoom focus point may have an interval where the timeline is linear, surrounded by non-linear intervals that transition between the zoomed-in portion and the zoomed-out portion of the timeline. The zoomed-out portion may also represent time linearly but at a different scale. The timeline may be shaded such that different colors, different color intensities, or different shades of gray indicate the time density at different parts of the timeline. Gradients may be used for non-linear portions of the timeline.

In an embodiment, the number of pixels used for the linear zoomed-in portions of the timeline remains constant. For example, each of the two focus points may be assigned 20% of the total pixels in the timeline. In the above example of the one-hour video, this would correspond to 12 minutes without zoom or 3 minutes with a zoom factor of 4. The focus point may be selected such that the chosen start or end point is in the center of the interval, or the start or end point may be off-center if there is a preference for increasing or decreasing the length of the video clip.

The zoom factor for a particular interval along the timeline may determine the tree level for selecting video segment boundaries to display along that interval in the timeline. For example, if a zoom factor increases by a factor of 2 for each level of the segment boundary tree, a zoom factor of 1 would correspond to the first level of the tree, a zoom factor of 2 to the second level, a zoom factor of 4 to the third level, and so on. Thus, by checking the zoom factor at a particular point of the timeline, the corresponding tree level may be determined. Zoom factors not directly corresponding to tree levels may be rounded to the nearest corresponding zoom level. For example, a zoom factor of 5 may be mapped to the third tree level, and a zoom factor of 7 to the fourth level. In the non-linear portions of the timeline, tree levels may be used that were not selected directly by the user.

To select either the start or end point of the video clip, the user may choose to navigate down or up the cluster tree. The interface may work via both touch-based, mouse-based, and keyboard-based controls. Navigation may take place with a mouse click or touch gesture on a keyframe presenting a segment. According to an embodiment, a double-tap may set the start and end points to the beginning and end of the selected segment and navigate down the cluster tree to the children of the selected segment. Navigation up or down the tree may be done separately for the start or end point, for example, with a downwards drag gesture on the segment that holds the start or end point. Start and end points may be moved with horizontal drag gestures. At lower tree levels, start and end points may be moved beyond the boundaries set by segments higher in the tree. All segments at the same tree level are put in a sequence. Navigation is possible across the whole sequence. In case of unbalanced trees, parents assume the role of their non-existing children at a particular level. The lowest level is that of the lowest leaf nodes in the tree.

This navigation causes changes to the timeline and to the displayed keyframes. The user may use mouse or touch gestures to move a clip boundary to the next or previous cluster at the current level in the segment boundary tree. At the top-level of the tree, such changes will increase or decrease the length of the video clip by large amounts. At lower tree levels, the amount of change decreases. This allows the user to make a coarse selection quickly and then to descend into the cluster tree to refine the selection.

After a user has selected a start and/or end point of a clip using the hierarchic segment browser, the user may be finished or the user may want even more fine grained manipulation of the selected start and/or end point. The tree browsing interface may allow for adjustments down to the level of the initial 200 ms segments. A traditional scrubbing interface may be provided that allows for frame level adjustments in a region around the currently selected boundary, thus allowing for fine grained access into a long video.

Figure 4A:
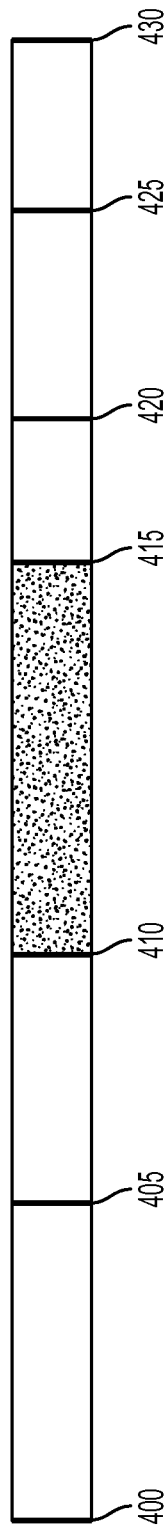
FIG. 4A illustrates a timeline in a video clip selection interface representing the top level of the segment boundary tree, according to an embodiment.

FIG. 4A illustrates a timeline in a video clip selection interface representing the top level of the segment boundary tree illustrated in FIG. 1. Keyframe 125 in FIG. 1 represents the segment running from boundary 400 to boundary 405 in the timeline. Keyframe 130 represents the segment running from boundary 405 to boundary 410 in the timeline. Keyframe 135 represents the segment running from boundary 410 to boundary 415 in the timeline. Keyframe 140 represents the segment running from boundary 415 to boundary 420 in the timeline. Keyframe 145 represents the segment running from boundary 420 to boundary 425 in the timeline. Keyframe 150 represents the segment running from boundary 425 to boundary 430 in the timeline. In this example, the user has selected keyframe 135, and thus the start and end points of the segment running from boundary 410 to boundary 415 in the timeline are selected as the start and end points of the video clip, as represented by the shading in the timeline.

Figure 4B:
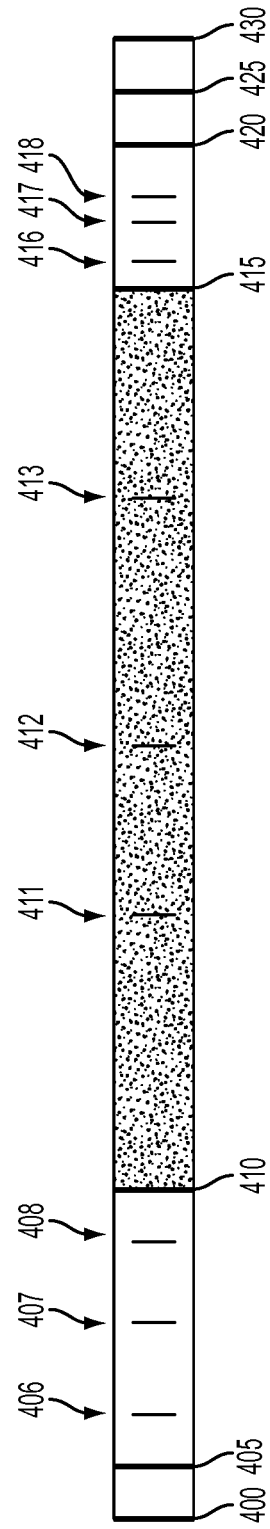
FIG. 4B illustrates a timeline in the video clip selection interface after a user has navigated down to the second level of the segment boundary tree, according to an embodiment.

FIG. 4B illustrates a timeline in the video clip selection interface after a user has navigated down to the second level of the segment boundary tree, according to an embodiment. The segment boundaries at the second level of the segment boundary tree that are temporally close to the zoom focus point are presented in the timeline. For example, in addition to the previously displayed boundaries 400, 405, 410, 415, 420, 425, and 430, boundaries 406, 407, 408, 411, 412, 413, 416, 417, and 418 at the second level of the segment boundary tree are also displayed.

Keyframe 160 in FIG. 1 represents the segment running from boundary 410 to boundary 411. Keyframe 165 represents the segment running from boundary 411 to boundary 412. Keyframe 170 represents the segment running from boundary 412 to boundary 413. Keyframe 175 represents the segment running from boundary 413 to boundary 415.

The start point for the video clip remains at boundary 410, and the end point remains at boundary 415. The shaded portion of the timeline in FIG. 4B represents the extent of the currently selected video clip.

Figure 4C:
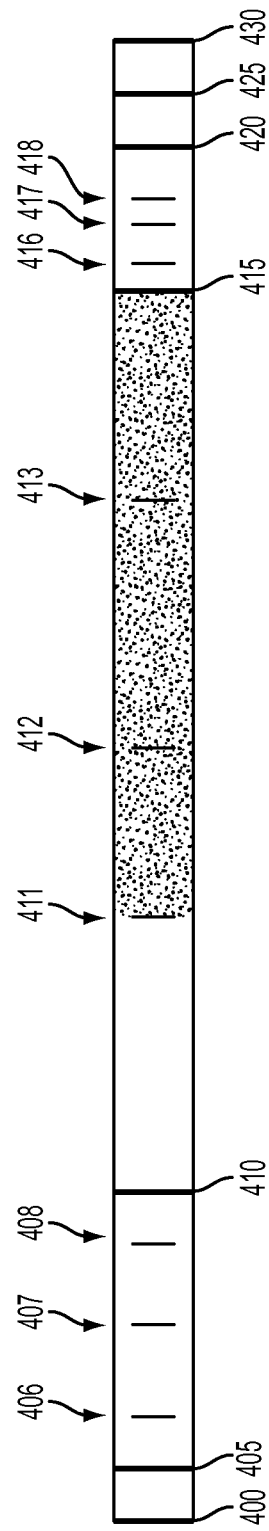
FIG. 4C illustrates a timeline in the video clip selection interface after a user has reduced a length of the clip, while at the second level of the segment boundary tree, according to an embodiment.

FIG. 4C illustrates a timeline in the video clip selection interface after a user has reduced a length of the clip, while at the second level of the segment boundary tree, according to an embodiment. Mouse or touch gestures or keyboard input may be used to move the start point of the video clip from boundary 410 to boundary 411, which is a boundary at the second level of the segment boundary tree, in FIG. 4C.

Figure 4D:
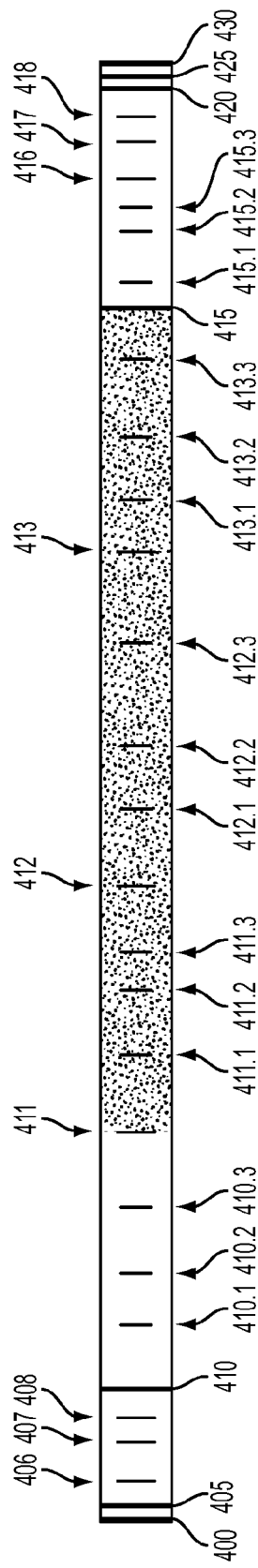
FIG. 4D illustrates a timeline in the video clip selection interface after a user has navigated down to the third level of the segment boundary tree, according to an embodiment.

FIG. 4D illustrates a timeline in the video clip selection interface after a user has navigated down to the third level of the segment boundary tree, according to an embodiment. The segment boundaries at the third level of the segment boundary tree that are temporally close to the zoom focus point are presented in the timeline. For example, in addition to the previously displayed boundaries 400, 405, 406, 407, 408, 410, 411, 412, 413, 415, 416, 417, 418, 420, 425, and 430, boundaries 410.1, 410.2, 410.3, 411.1, 411.2, 411.3, 412.1, 412.2, 412.3, 413.1, 413.2, 413.3, 415.1, 415.2, and 415.3 at the third level of the segment boundary tree are also displayed.

Keyframe 182 in FIG. 1 represents the segment running from boundary 411 to boundary 411.1. Keyframe 183 represents the segment running from boundary 411.1 to boundary 411.2. Keyframe 184 represents the segment running from boundary 411.2 to boundary 411.3. Keyframe 185 represents the segment running from boundary 411.3 to boundary 412.

Keyframe 186 in FIG. 1 represents the segment running from boundary 412 to boundary 412.1. Keyframe 187 represents the segment running from boundary 412.1 to boundary 412.2. Keyframe 188 represents the segment running from boundary 412.2 to boundary 412.3. Keyframe 189 represents the segment running from boundary 412.3 to boundary 413.

Keyframe 190 in FIG. 1 represents the segment running from boundary 413 to boundary 413.1. Keyframe 191 represents the segment running from boundary 413.1 to boundary 413.2. Keyframe 192 represents the segment running from boundary 413.2 to boundary 413.3. Keyframe 193 represents the segment running from boundary 413.3 to boundary 415.

The start point for the video clip remains at boundary 411, and the end point remains at boundary 415. The shaded portion of the timeline in FIG. 4D represents the extent of the currently selected video clip.

Figure 4E:
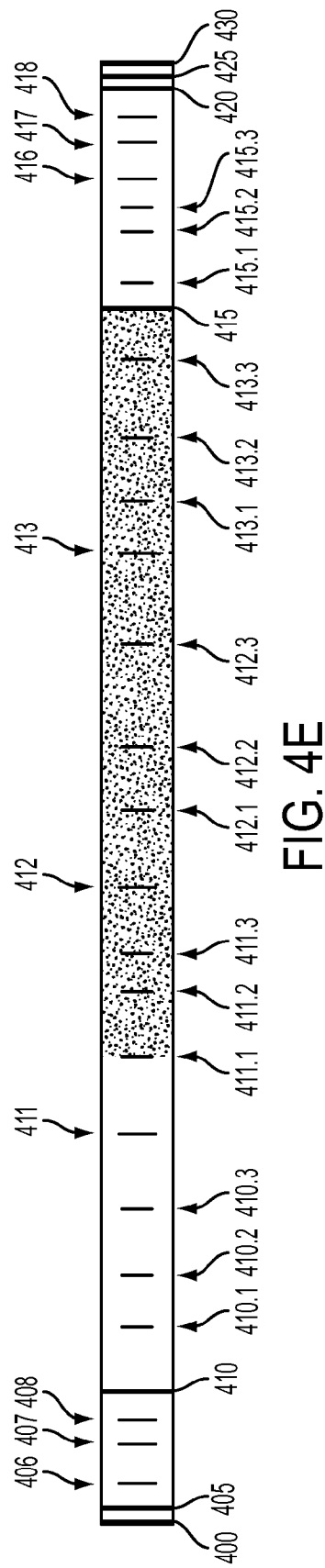
FIG. 4E illustrates a timeline in the video clip selection interface after a user has reduced a length of the clip, while at the third level of the segment boundary tree, according to an embodiment.

FIG. 4E illustrates a timeline in the video clip selection interface after a user has reduced a length of the clip, while at the third level of the segment boundary tree, according to an embodiment. Mouse or touch gestures or keyboard input may have been used to move the start point of the video clip from boundary 411 to boundary 411.1, which is a boundary at the second level of the segment boundary tree, in FIG. 4E.

Figure 5A:
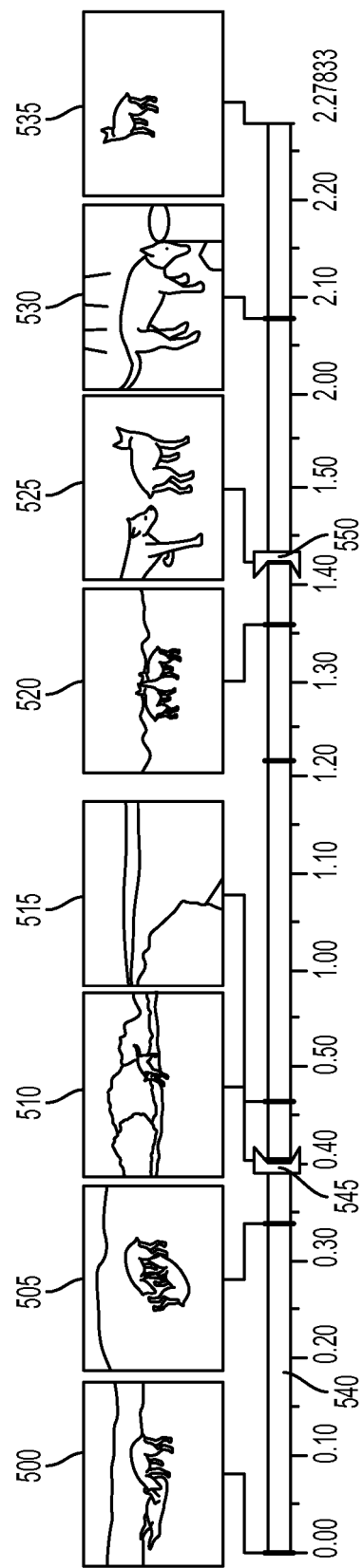
FIG. 5A illustrates a video clip selection interface before a user has navigated down from the top level of the segment boundary tree, according to an embodiment.

FIG. 5A illustrates a video clip selection interface before a user has navigated down from the top level of the segment boundary tree, according to an embodiment. Since no portion of the timeline has been zoomed-in at this point, the entire timeline is linear. Segment boundaries at the top level of the segment boundary tree are displayed above in the timeline 540, and keyframes 500, 505, 510, 515, 520, 525, 530, and 535 corresponding to the top level segment boundaries in the vicinity of the selected start point 545 and end point 550 are displayed. The interface may allow skipping from one segment boundary to the next segment boundary or to the previous segment boundary displayed on the timeline 540, using the left and right arrow keys on the keyboard.

Keyframes outside the regions around the start and end points 545 and 550 are not shown. Alternatively, these keyframes outside the regions around the start and end points 545 and 550 may be shown in a smaller size or stacked on top of each other (as illustrated by the keyframe stacks 310 and 340 in FIG. 3), occluding each other partially.

Figure 5B:
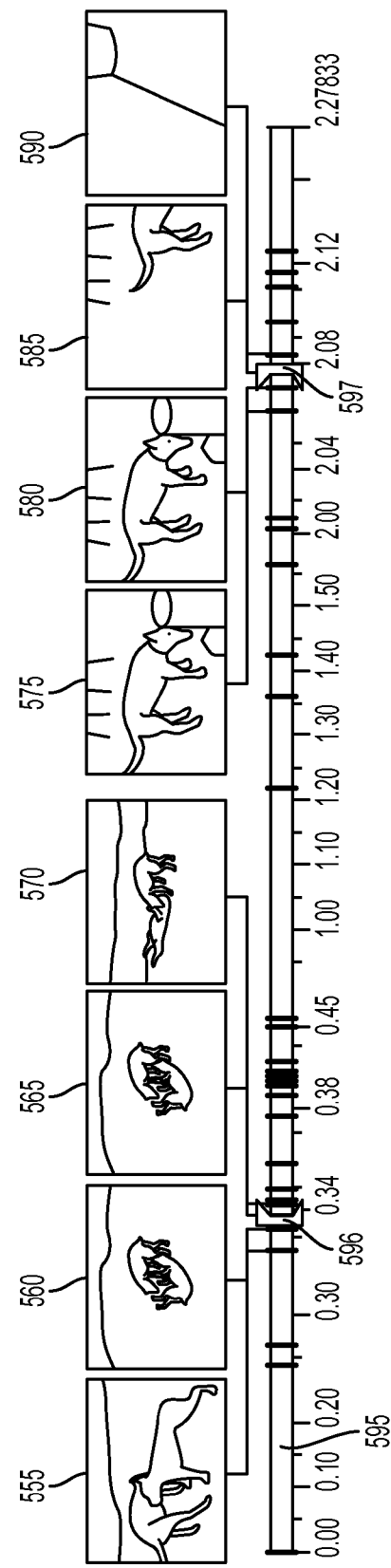
FIG. 5B illustrates a video clip selection interface after a user has zoomed in around zoom focus points, causing segment boundaries below the top level of the segment boundary tree to be displayed, according to an embodiment.

FIG. 5B illustrates a video clip selection interface after a user has zoomed in around zoom focus points, causing segment boundaries below the top level of the segment boundary tree to be displayed, according to an embodiment. Portions of the timeline 595 around the start point 596 and end point 597 have been zoomed-in, for example using the down or up arrow keys on the keyboard. The zoomed-out portions of the timeline 595 are linear, as are the zoomed-in portions around the zoom focus points (in this case, start point 596 and end point 597). Each pixel in the zoomed-in portion of the timeline 595 represents a shorter segment of video as compared to each pixel in the zoomed-out portion of the timeline 595. The timeline 595 is non-linear in portions transitioning between the zoomed-out portions and the zoomed-in portions. Keyframes 555, 560, 565, 570, 575, 580, 585, and 590 representing the lower-level segment boundaries appearing in the timeline around the zoom focus points may be displayed along with lines connecting to the corresponding segment boundaries in the timeline 595.

Figure 6:
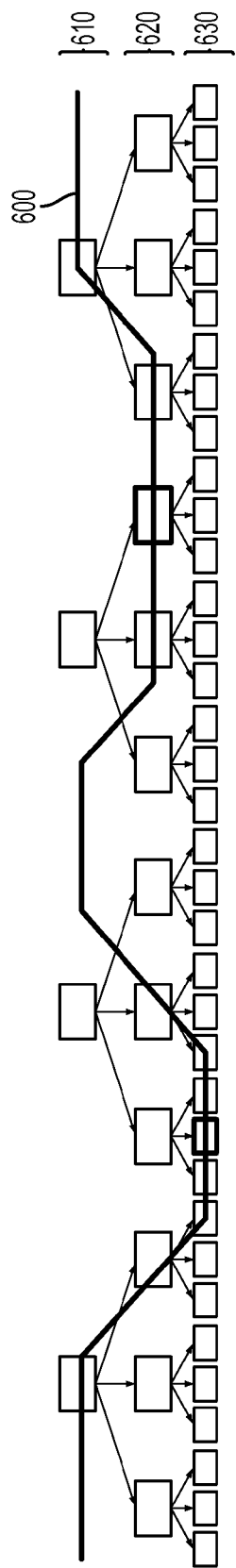
FIG. 6 illustrates a zoom level in a timeline of a video clip selection interface, according to an embodiment.

FIG. 6 illustrates a zoom level 600 in a timeline of a video clip selection interface, according to an embodiment. At each point in the timeline, segment boundaries at the tree level corresponding to the zoom level 600 at that point in the timeline are displayed.

For example, at the beginning and end of the timeline illustrated in FIG. 6, the zoom factor is 1 (fully zoomed-out), and segment boundaries 610 at the top level of the segment boundary tree are displayed for those portions of the timeline. The zoom factor 600 is 4 at the selected start point (the bold keyframe representing a segment boundary at the third level of the segment boundary tree) for the video clip, and thus segment boundaries 630 at the third level of the segment boundary tree are displayed for those portions of the timeline around that zoom focus point. The zoom factor 600 is 2 at the selected end point (the bold keyframe representing a segment boundary at the second level of the segment boundary tree) for the video clip, and thus segment boundaries 620 at the second level of the segment boundary tree are displayed for those portions of the timeline around that zoom focus point.

As noted previously, in the non-linear portions of the timeline, tree levels may be used that were not directly selected by the user. For example, between the start of the video and the selected start point for the video clip, keyframes 620 representing segment boundaries at the second level of the segment boundary tree may be displayed.

Figure 7:
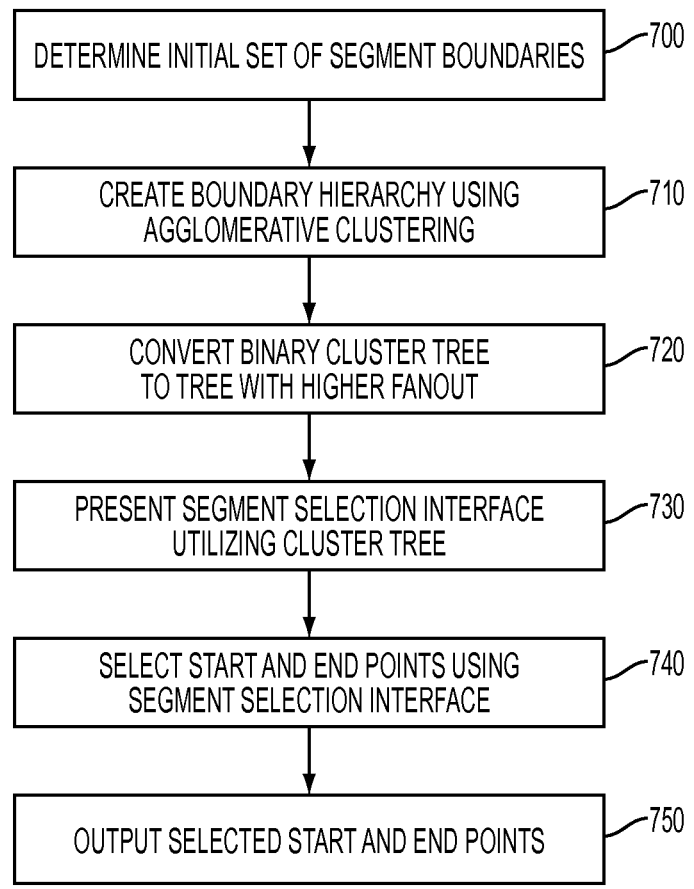
FIG. 7 is a flow diagram illustrating a process for selecting video clip start and end points, according to an embodiment.

FIG. 7 is a flow diagram illustrating a process for selecting video clip start and end points, according to an embodiment. In block 700, an initial set of segment boundaries is determined using the video segmentation algorithm described above. In block 710, a boundary hierarchy is created using agglomerative clustering. As discussed above, the boundary hierarchy may be represented as a binary cluster tree. In block 720, the segment boundary tree (binary cluster tree) is converted to a tree with higher fanout. In block 730, a segment selection interface is presented. The segment selection interface may include a timeline which displays segment boundaries from one or more levels of the segment boundary tree. Keyframes representing segment boundaries may also be displayed in the segment selection interface. In block 740, start and end points for a video clip are selected using the segment selection interface. In block 750, the selected start and end points for the video clip are output.

Figure 8:
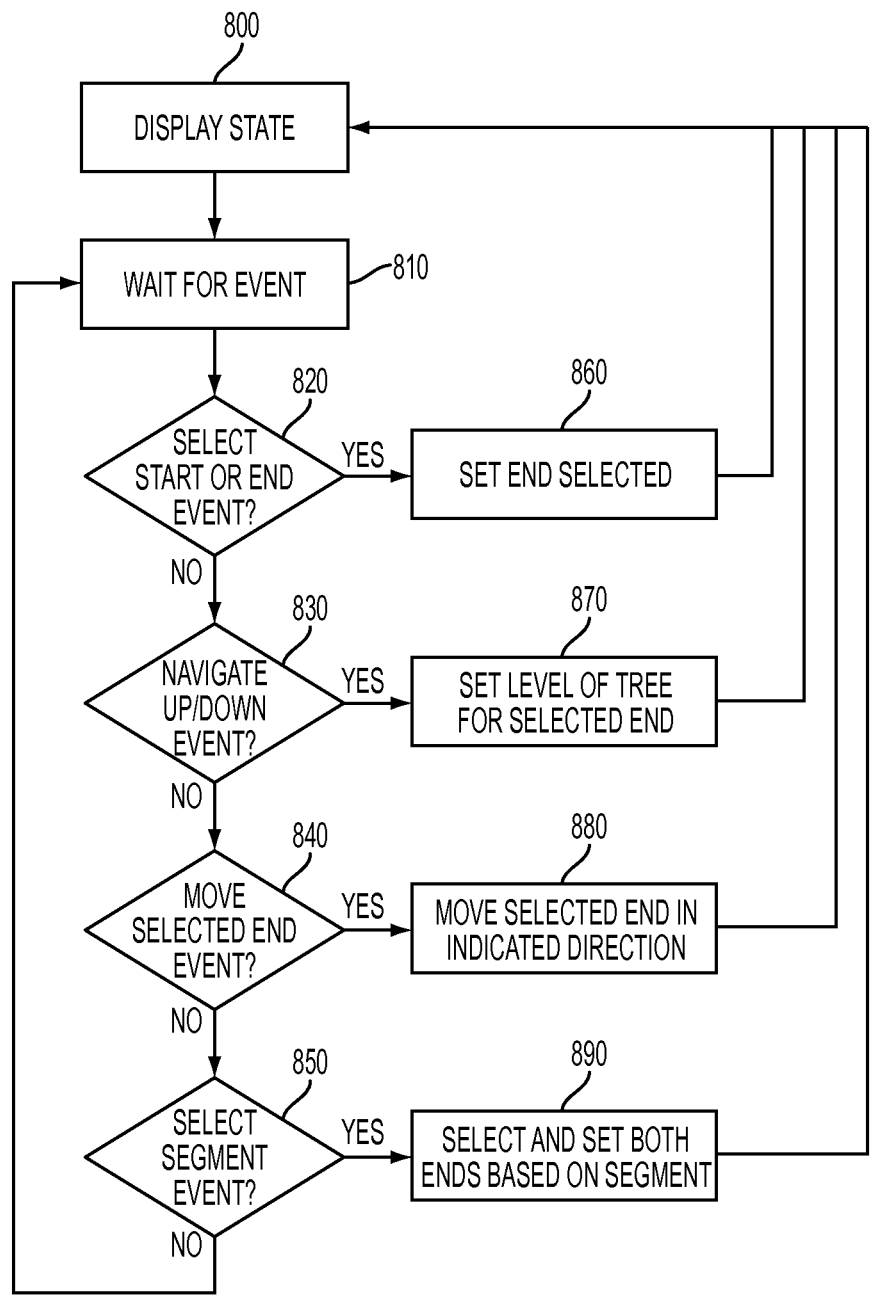
FIG. 8 is a flow diagram illustrating a workflow for a video clip selection interface, according to an embodiment.

FIG. 8 is a flow diagram illustrating a workflow for a segment selection interface, according to an embodiment. In block 800, a current display state is output to a display device such as a monitor. The current display state may include the timeline, various segment boundaries from the segment boundary tree, keyframes representing the displayed segment boundaries, and start and end points for a video clip. In block 810, the interface waits for an event.

In block 820, it is determined whether a select start or end of a video clip event is received. If a select start or end of a video clip event is received, flow proceeds to block 860, and the start or end point of the video clip is set according to the received event. Flow then proceeds to block 800, and the current display state is output. On the other hand, if a select start or end of a video clip event is not received, flow proceeds to block 830.

In block 830, it is determined whether a navigate up/down event is received. If a navigate up/down event is received, flow proceeds to block 870, and a level of the segment boundary tree for an interval of the timeline around the selected start or end point is set according to the event. For example, if the start point is selected, and the current zoom factor is 1 (corresponding to the top level of the tree), a navigate down event may result in the zoom factor increasing to 2 and the level of the tree being set to 2 for an interval of the timeline around the selected start point. The zoom factor and tree level remains unchanged for other portions of the timeline. Flow then proceeds to block 800, and the current display state is output. In the previous example, the display may be updated to show segment boundaries at the second level of the segment boundary tree in the interval of the timeline surrounding the start point, which is the zoom focus point in this case. On the other hand, if a navigate up/down event is not received, flow proceeds to block 840.

In block 840, it is determined whether a move selected start or end point event is received. If a move selected start or end point event is received, flow proceeds to block 880, and the selected start or end point is moved in the direction indicated by the event. The selected start or end point may be moved to an adjacent segment boundary displayed in the timeline. Alternatively, a more fine grained adjustment may be made. Flow then proceeds to block 800, and the current display state reflecting the moved start or end point is output. On the other hand, if a move selected start or end point event is not received, flow proceeds to block 850.

In block 850, it is determined whether a select segment event is received. If a select segment event is received, flow proceeds to block 890, and the start and end points for the video clip are selected and set based on the start and end points of the selected segment. Flow then proceeds to block 800, and the current display state is output. On the other hand, if a select segment event is not received, flow proceeds to block 810, and the interface waits for an event.

Figure 9:
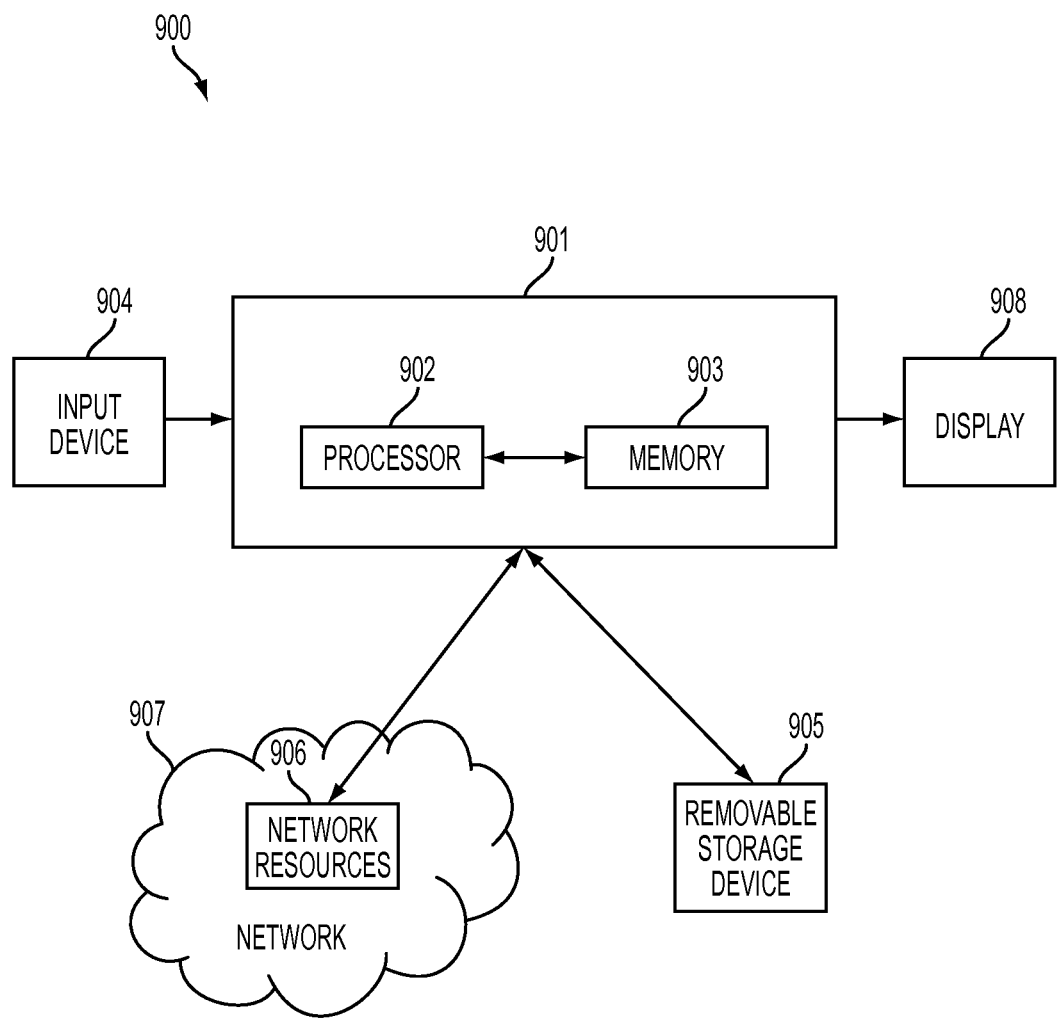
FIG. 9 is a block diagram illustrating a computer system upon which the system may be implemented, according to an embodiment.

FIG. 9 is a block diagram illustrating a computer system upon which the system may be implemented, according to an embodiment. The system 900 includes a computer/server platform 901 including a processor 902 and memory 903 which operate to execute instructions, as known to one of skill in the art. The term "computer-readable storage medium" as used herein refers to any tangible medium, such as a disk or semiconductor memory, that participates in providing instructions to processor 902 for execution. Additionally, the computer platform 901 receives input from a plurality of input devices 904, such as a keyboard, mouse, touch device, touchscreen, or microphone. The computer platform 901 may additionally be connected to a removable storage device 905, such as a portable hard drive, optical media (CD or DVD), disk media or any other tangible medium from which a computer can read executable code. The computer platform may further be connected to network resources 906 which connect to the Internet or other components of a local public or private network. The network resources 906 may provide instructions and data to the computer platform from a remote location on a network 907. The connections to the network resources 906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 901. The computer interacts with a display 908 to output data and other information to a user, as well as to request additional instructions and input from the user. The display 908 may be a touchscreen display and may act as an input device 904 for interacting with a user.

Figure 10:
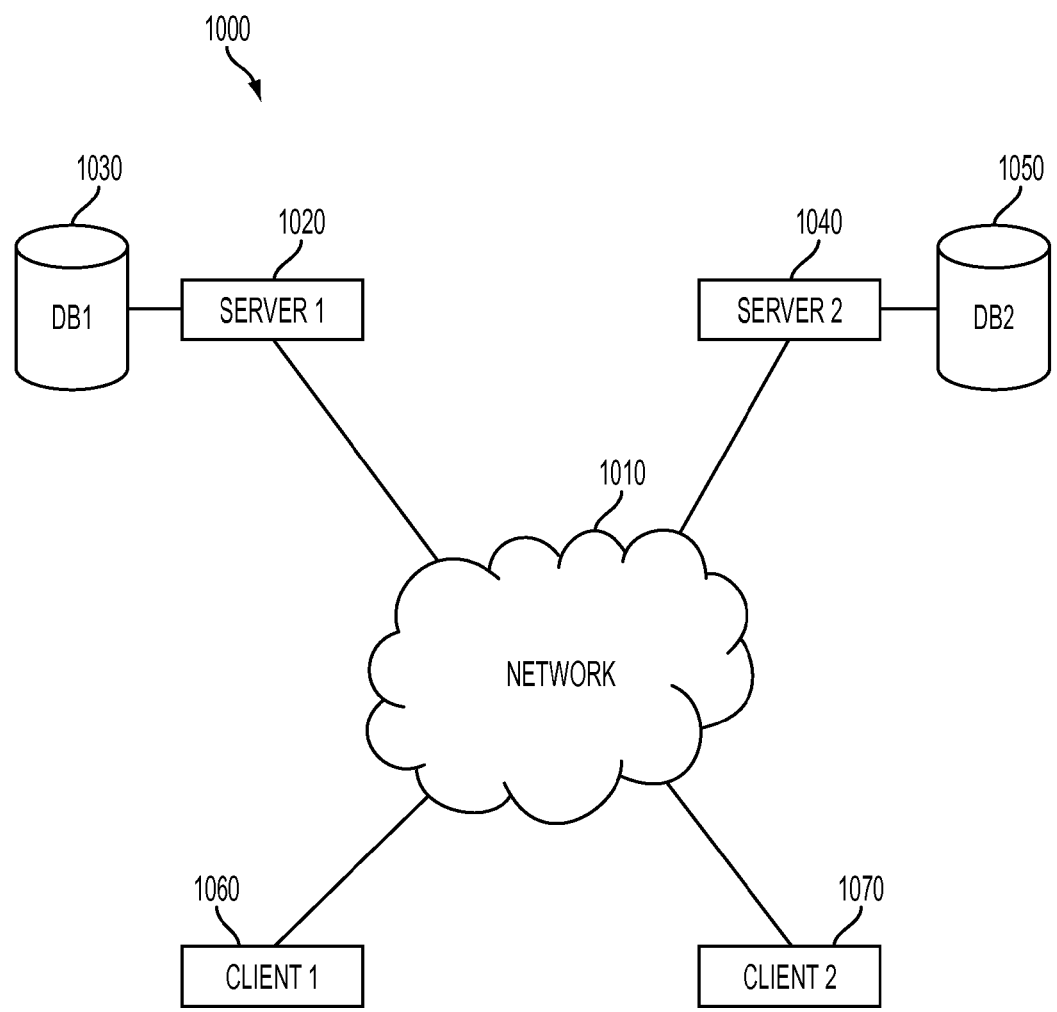
FIG. 10 is a block diagram illustrating a network including servers upon which the system may be implemented and client machines that communicate with the servers, according to an embodiment.

FIG. 10 is a block diagram that illustrates an embodiment of a network 1000 including servers 1020, 1040 upon which the system may be implemented and client machines 1060, 1070 that communicate with the servers 1020, 1040. The client machines 1020, 1040 communicate across the Internet or another wide area network (WAN) or local area network (LAN) 1010 with server 1 1020 and server 2 1040. Server 1 1020 communicates with database 1 1030, and server 2 1040 communicates with database 2 1050. According to an embodiment, server 1 1020 and server 2 1040 may implement a video clip selection interface. Client 1 1060 and client 2 1070 may select a video clip using the video clip selection interface implemented on server 1 1020 and server 2 1040. Server 1 1020 may communicate with database 1 1030 in the process of providing a video clip selection interface, and server 2 1040 may communicate with database 2 1050 in the process of providing a video clip selection interface.

Figure 11:
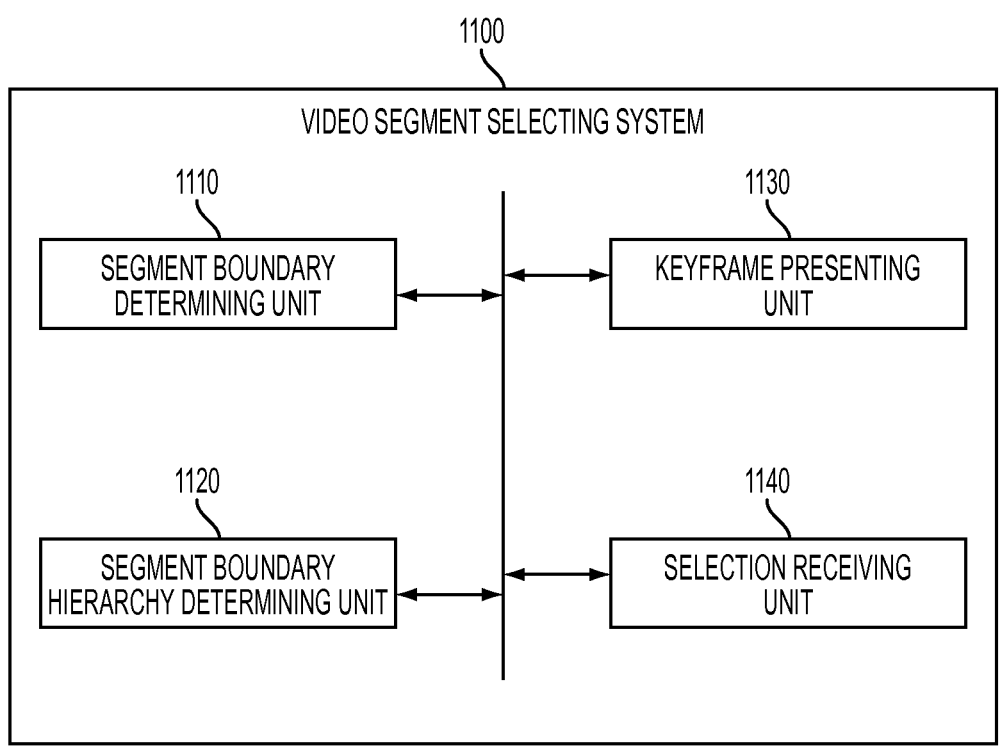
FIG. 11 is a block diagram illustrating a video segment selecting system, according to an embodiment.

FIG. 11 is a block diagram illustrating a video segment selecting system, according to an embodiment. The video segment selecting system includes a segment boundary determining unit 1110 that determines a set of segment boundaries in a video, a segment boundary hierarchy determining unit 1120 that determines a segment boundary tree from the set of segment boundaries determined by the segment boundary determining unit 1110, a keyframe presenting unit 1130 that presents a video timeline that shows a plurality of segment boundaries from a first level of the segment boundary tree and keyframes corresponding to the plurality of segment boundaries from the first level of the segment boundary tree determined by the segment boundary hierarchy determining unit 1120, and a selection receiving unit receives a selection point and a request to change a zoom factor for an interval of the video timeline around the selection point.

The video segment selection system may be implemented as an HTML5 control, a browser plug-in, a web application, JavaScript, a Java applet, or as a desktop program.

According to another embodiment, the system and interface may be used for selecting a segment from other types of media clips, such as audio clips, through interaction with the hierarchic segmentation.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method for selecting a segment of a video, the method comprising:
   determining, using a processor, a set of segment boundaries in the video;
   determining a segment boundary tree from the set of segment boundaries;
   presenting a video timeline that shows a plurality of segment boundaries from a first level of the segment boundary tree;
   receiving a first selection point and a first request to change a zoom factor for an interval of the video timeline around the first selection point; and
   in response to the first request to change the zoom factor for the interval of the video timeline around the first selection point, updating the video timeline in the interval around the first selection point to show a plurality of segment boundaries from a second level of the segment boundary tree corresponding to the changed zoom factor.

2. The method of claim 1, wherein the presenting the video timeline further comprises presenting keyframes corresponding to the plurality of segment boundaries from the first level of the segment boundary tree.

3. The method of claim 2, wherein the updating the video timeline further comprises presenting keyframes corresponding to the plurality of segment boundaries from the second level of the segment boundary tree.

4. The method of claim 1, further comprising:
   receiving a refined selection point corresponding to one of the plurality of segment boundaries from the second level of the segment boundary tree,
   wherein the refined selection point is a start point or an end point for the segment of the video.

5. The method of claim 3, further comprising:
   receiving a second request to change the zoom factor for the interval of the video timeline around the first selection point;
   in response to the second request to change the zoom factor, updating the video timeline in the interval around the first selection point to show a plurality of segment boundaries from a third level of the segment boundary tree corresponding to the changed zoom factor and keyframes corresponding to the plurality of segment boundaries from the third level of the segment boundary tree; and
   receiving a refined selection point corresponding to one of the plurality of segment boundaries from the third level of the segment boundary tree,
   wherein the refined selection point is a start point or an end point for the segment of the video.

6. The method of claim 1, wherein the video timeline is linear in a first interval comprising at least a portion of the interval around the first selection point, linear in a second interval, and non-linear between the first interval and the second interval.

7. The method of claim 1, further comprising:
   receiving a second selection point and a request to change a zoom factor for an interval of the video timeline around the second selection point; and
   in response to the request to change the zoom factor for the interval of the video timeline around the second selection point, updating the video timeline in the interval around the second selection point to show a plurality of segment boundaries from a third level of the segment boundary tree corresponding to the changed zoom factor,
   wherein the first selection point specifies a beginning of the segment of the video and the second selection point specifies an end of the segment of the video.

8. A method for selecting a segment of a media clip, the method comprising:
   determining, using a processor, a set of segment boundaries in the media clip;
   determining a segment boundary tree from the set of segment boundaries;
   presenting a timeline that shows a plurality of segment boundaries from a first level of the segment boundary tree;
   receiving a selection point and a request to change a zoom factor for an interval in the timeline,
   updating the interval in the timeline to show a plurality of segment boundaries from a second level of the segment boundary tree; and
   selecting the segment of the media clip such that a beginning of the segment of the media clip corresponds with a first segment boundary and an end of the segment of the media clip corresponds with a second segment boundary; and
   wherein the interval in the timeline is located around the selection point, and
   wherein the updating the interval in the timeline performed in response to the request to change the zoom factor for the interval in the timeline.

9. The method of claim 8, wherein the first segment boundary is selected from the plurality of segment boundaries from the first level of the segment boundary tree and the plurality of segment boundaries from the second level of the segment boundary tree, and
   wherein the second segment boundary is selected from the plurality of segment boundaries from the first level of the segment boundary tree and the plurality of segment boundaries from the second level of the segment boundary tree.

10. The method of claim 8, wherein the media clip comprises a video file.

11. The method of claim 8, wherein the media clip comprises an audio file.

12. A non-transitory computer readable medium storing a program causing a computer to execute a method for selecting a segment of a video, the method comprising:
  determining a set of segment boundaries in the video;
  determining a segment boundary tree from the set of segment boundaries;
  presenting a video timeline that shows a plurality of segment boundaries from a first level of the segment boundary tree;
  receiving a first selection point and a first request to change a zoom factor for an interval of the video timeline around the first selection point; and
  in response to the first request to change the zoom factor for the interval of the video timeline around the first selection point, updating the video timeline in the interval around the first selection point to show a plurality of segment boundaries from a second level of the segment boundary tree corresponding to the changed zoom factor.

13. The non-transitory computer readable medium of claim 12, wherein the presenting the video timeline further comprises presenting keyframes corresponding to the plurality of segment boundaries from the first level of the segment boundary tree.

14. The non-transitory computer readable medium of claim 13, wherein the updating the video timeline further comprises presenting keyframes corresponding to the plurality of segment boundaries from the second level of the segment boundary tree.

15. The non-transitory computer readable medium of claim 12, further comprising:
  receiving a refined selection point corresponding to one of the plurality of segment boundaries from the second level of the segment boundary tree,
  wherein the refined selection point is a start point or an end point for the segment of the video.

16. The non-transitory computer readable medium of claim 14, further comprising:
  receiving a second request to change the zoom factor for the interval of the video timeline around the first selection point;
  in response to the second request to change the zoom factor, updating the video timeline in the interval around the first selection point to show a plurality of segment boundaries from a third level of the segment boundary tree corresponding to the changed zoom factor and keyframes corresponding to the plurality of segment boundaries from the third level of the segment boundary tree; and
  receiving a refined selection point corresponding to one of the plurality of segment boundaries from the third level of the segment boundary tree,
  wherein the refined selection point is a start point or an end point for the segment of the video.

17. The non-transitory computer readable medium of claim 12, wherein the video timeline is linear in a first interval comprising at least a portion of the interval around the first selection point, linear in a second interval, and non-linear between the first interval and the second interval.

18. The non-transitory computer readable medium of claim 12, further comprising:
  receiving a second selection point and a request to change a zoom factor for an interval of the video timeline around the second selection point; and
  in response to the request to change the zoom factor for the interval of the video timeline around the second selection point, updating the video timeline in the interval around the second selection point to show a plurality of segment boundaries from a third level of the segment boundary tree corresponding to the changed zoom factor,
  wherein the first selection point specifies a beginning of the segment of the video and the second selection point specifies an end of the segment of the video.

19. A system for selecting a segment of a video, the system comprising:
  a segment boundary determining unit, comprising a processor, that determines a set of segment boundaries in the video;
  a segment boundary tree determining unit that determines a segment boundary tree from the set of segment boundaries determined by the segment boundary determining unit;
  a video timeline presenting unit that presents a video timeline that shows a plurality of segment boundaries from a first level of the segment boundary tree determined by the segment boundary tree determining unit; and
  a selection point receiving unit that receives a first selection point and a first request to change a zoom factor for an interval of the video timeline around the first selection point,
  wherein the video timeline presenting unit, in response to the first request to change the zoom factor for the interval of the video timeline around the first selection point, updates the video timeline in the interval around the first selection point to show a plurality of segment boundaries from a second level of the segment boundary tree corresponding to the changed zoom factor.

20. The system of claim 19, wherein the video timeline presenting unit further presents keyframes corresponding to the plurality of segment boundaries from the first level of the segment boundary tree.

21. The system of claim 20, wherein the video timeline presenting unit updating the video timeline in the interval around the first selection point further comprises the video timeline presenting unit presenting keyframes corresponding to the plurality of segment boundaries from the second level of the segment boundary tree.

22. The system of claim 19, wherein:
  the selection point receiving unit receives a refined selection point corresponding to one of the plurality of segment boundaries from the second level of the segment boundary tree; and
  the refined selection point is a start point or an end point for the segment of the video.

23. The system of claim 21, wherein:
  the selection point receiving unit receives a second request to change the zoom factor for the interval of the video timeline around the first selection point; and
  the video timeline presenting unit, in response to the second request to change the zoom factor received by the selection point receiving unit, displays a plurality of segment boundaries from a third level of the segment boundary tree corresponding to the changed zoom factor and keyframes corresponding to the plurality of segment boundaries from the third level of the segment boundary tree;

the selection point receiving unit receives a refined selection point corresponding to one of the plurality of segment boundaries from the third level of the segment boundary tree; and the refined selection point is a start point or an end point for the segment of the video.

24. The system of claim 19, wherein the video timeline presented by the video timeline presenting unit is linear in a first interval comprising at least a portion of the interval around the first selection point, linear in a second interval, and non-linear between the first interval and the second interval.

25. The system of claim 19, wherein:

the selection point receiving unit receives a second selection point and a request to change a zoom factor for an interval of the video timeline around the second selection point;

the video timeline presenting unit, in response to the request to change the zoom factor for the interval of the video timeline around the second selection point, updates the video timeline in the interval around the second selection point to show a plurality of segment boundaries from a third level of the segment boundary tree corresponding to the changed zoom factor; and the first selection point specifies a beginning of the segment of the video and the second selection point specifies an end of the segment of the video.

* * * * *